United States Patent [19]

Subramanian et al.

[11] Patent Number: 5,127,006
[45] Date of Patent: Jun. 30, 1992

[54] FAULT DIAGNOSTIC SYSTEM

[75] Inventors: Krishnan Subramanian, Los Angeles, Calif.; Meyer A. Billmers, Lexington, Mass.

[73] Assignee: Digital Equipment Corporation, Maynard, Mass.

[21] Appl. No.: 729,901

[22] Filed: Jul. 15, 1991

Related U.S. Application Data

[63] Continuation of Ser. No. 526,400, May 21, 1990, abandoned, which is a continuation-in-part of Ser. No. 345,587, May 1, 1989, abandoned.

[51] Int. Cl.⁵ .............................................. G06F 11/00
[52] U.S. Cl. ...................................... 371/16.1; 371/23; 371/49.1; 364/275.7; 364/DIG. 1
[58] Field of Search ............... 371/23, 29.1, 22.1, 371/19, 15.1, 16.5, 16.1, 49.1; 364/513, 200, 900

[56] References Cited

U.S. PATENT DOCUMENTS

| | | | |
|---|---|---|---|
| 4,649,515 | 3/1987 | Thompson | 364/900 |
| 4,658,352 | 4/1987 | Nagasawa | 364/200 |
| 4,766,595 | 8/1988 | Gollomp | 371/23 |
| 4,791,578 | 12/1988 | Fazio | 371/23 X |
| 4,866,635 | 9/1989 | Kahn | 364/200 X |
| 4,907,180 | 3/1990 | Smith | 371/23 X |

OTHER PUBLICATIONS

D. Larner, "A Recursive Expert Troubleshooting System Utilizing General & Specific Knowledge," Second Conference on Artificial Intelligence Applications: The Engineeering of Knowledge-Based Systems., Dec. 11-13, 1985, pp. 34-41.

H. Shubin et al., "IDT: An Intelligent Diagnostic Tool", Proceedings of the National Confernce on Artificial Intelligence, Aug. 18-20, 1982, pp. 290-295.

K. Subramanian, "Fault Diagnosis in Complex Circuits," Session Notes for DECUS talk A1051, May 20, 1988.

K. Subramanian et al., "Fault Diagnosis in Complex Digital Circuits," Fifth Conference on Artificial Intelligence Applications, Mar. 1989, pp. 159-164.

R. Davis, "Diagnostic Reasoning Based on Structure and Behavior," Artificial Intelligence: An International Journal, Dec. 1984, vol. 24, Nos. 1-3, pp. 347-410.

R. Davis et al., "Diagnosis Based on Description of Structure & Function," Proceedings of the National Conference on Artificial Intelligence, Aug. 18-20, 1982, pp. 137-142.

G. Goh, "Troubleshooting Parity Errors-A Causual Approach," Undergraduate Thesis, Department of Electrical Engineering & Compuer Science, Massachusetts Instiute of Technology, Aug. 1987.

J. de Kleer et al., "Diagnosing Multiple Faults," Artificial Intelligence: An Internatinoal Journal, vol. 32, No. 1, Apr. 1987, pp. 97-130.

T. Laffey al., "Reasoning About Fault Diagnosis with LES," First Conference on Artificial Intelligence Applications, Dec. 5-7, 1984, pp. 267-273.

*Primary Examiner*—Robert W. Beausoliel
*Attorney, Agent, or Firm*—Finnegan, Henderson, Farabow, Garrett and Dunner

[57] ABSTRACT

A fault diagnosis system which detects possible faulty components in a complex system. The complex system is represented by a representation comprising a plurality of nodes interconnected by links defining a flow among nodes corresponding to flows in the complex system. At least one of the nodes is a checkpoint node, which generates a report if the flow received by it is not correct. A fault diagnosis processor performing upstream search operation to repeatedly (such as by recursion of iteration) step in upstream path, that is, opposite to the direction of flow in the complex system, from node to node starting with the reporting checkpoint node. At each step, the fault diagnosis processor indicts components represented by both nodes and links in the representation.

48 Claims, 9 Drawing Sheets

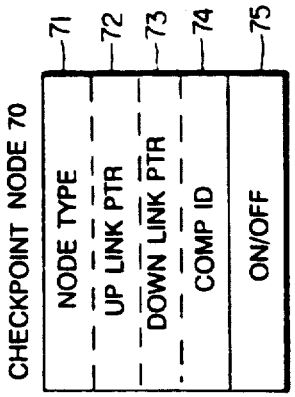
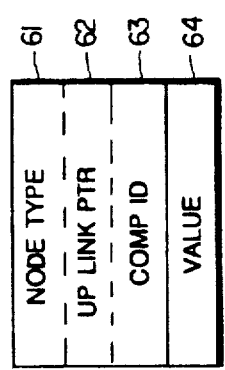
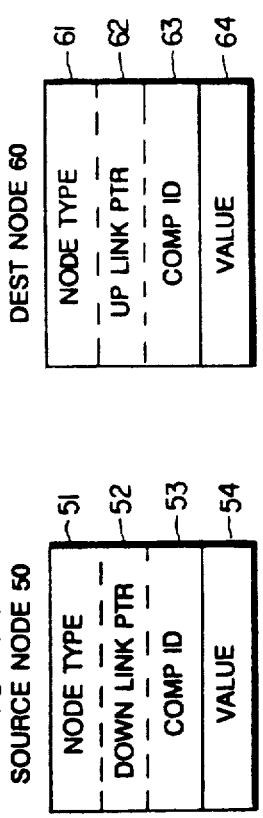
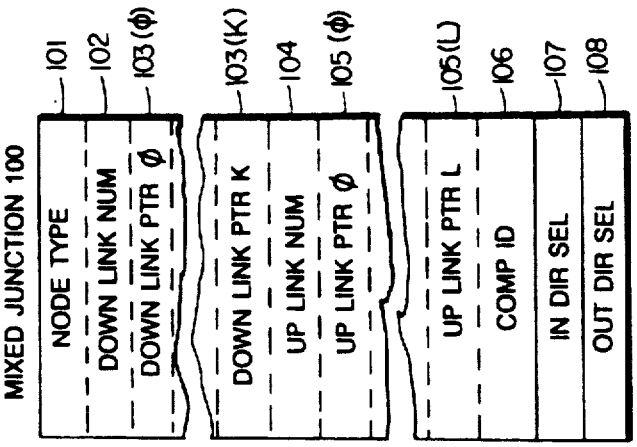
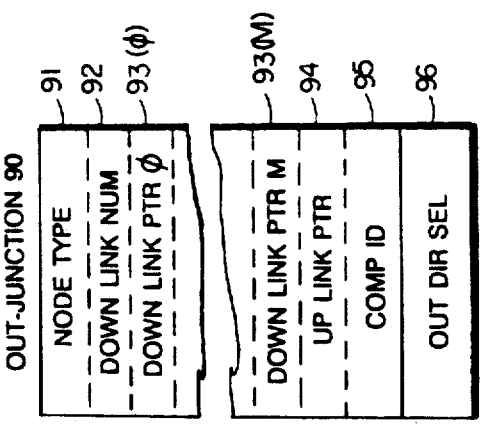
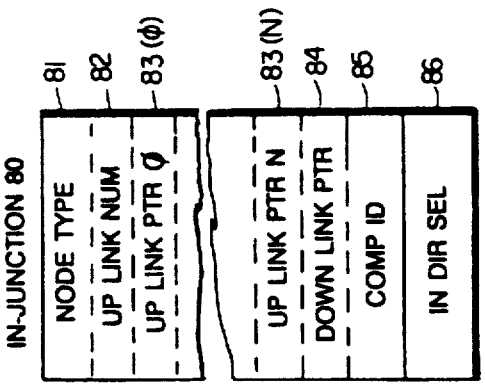

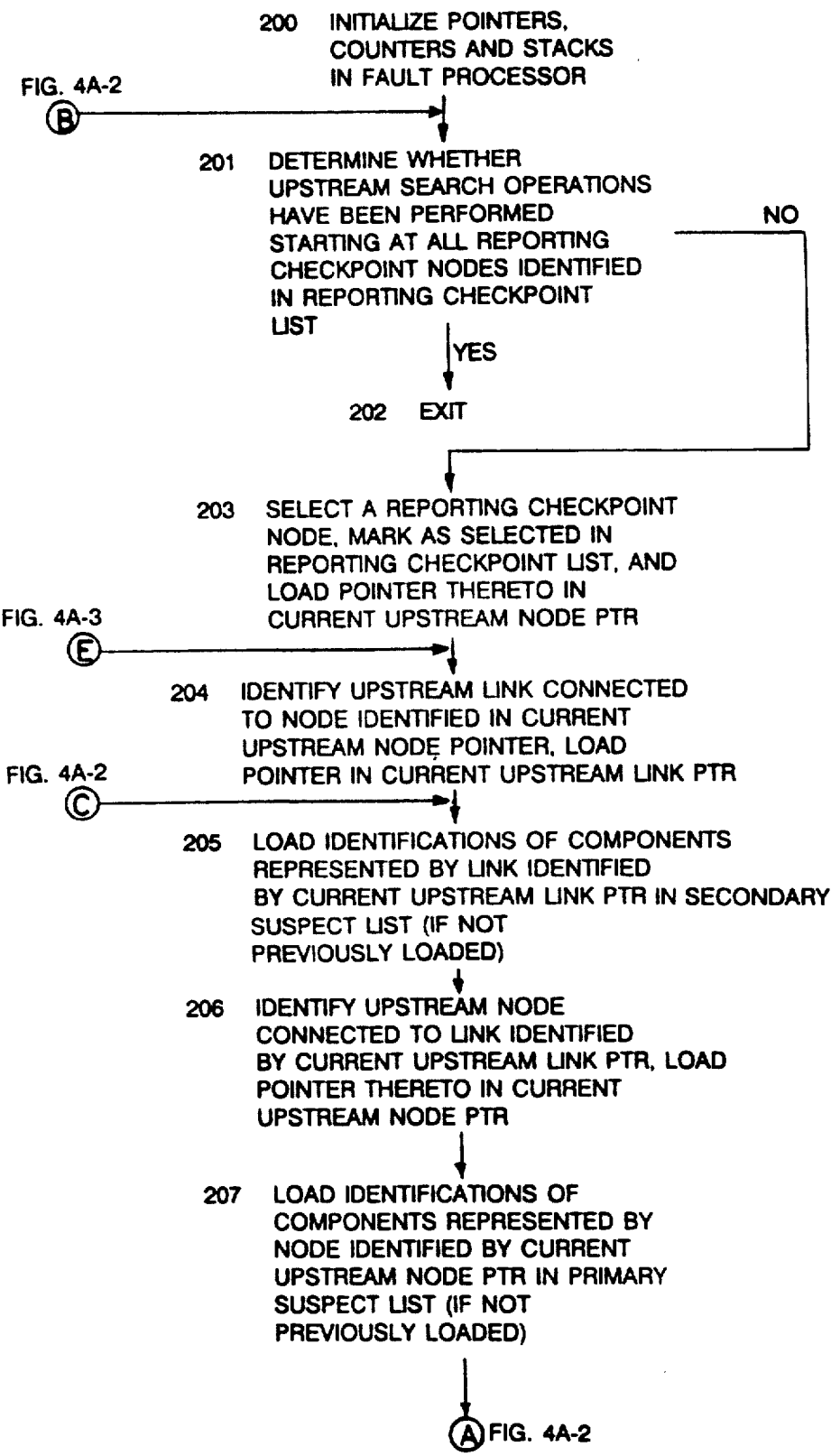

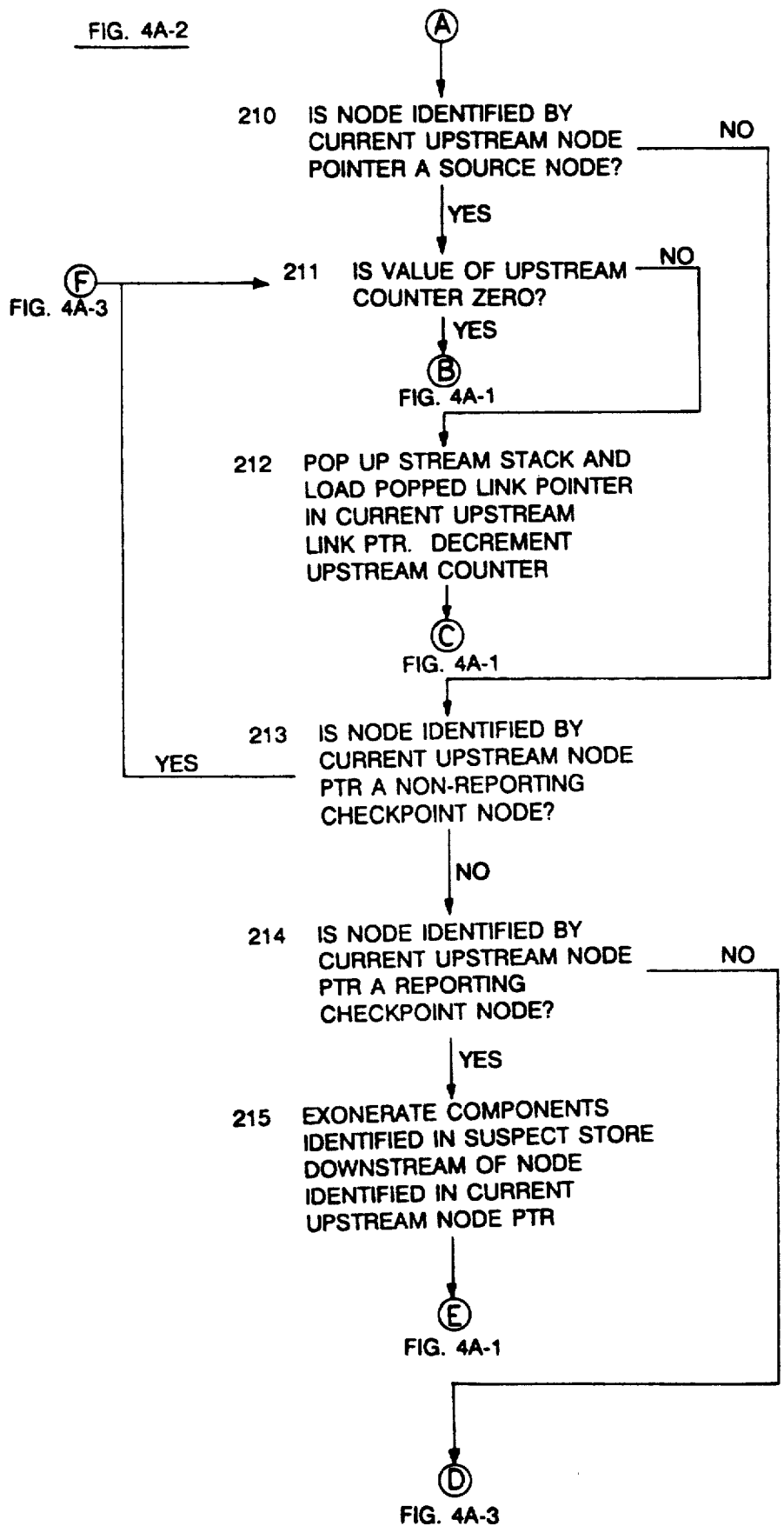

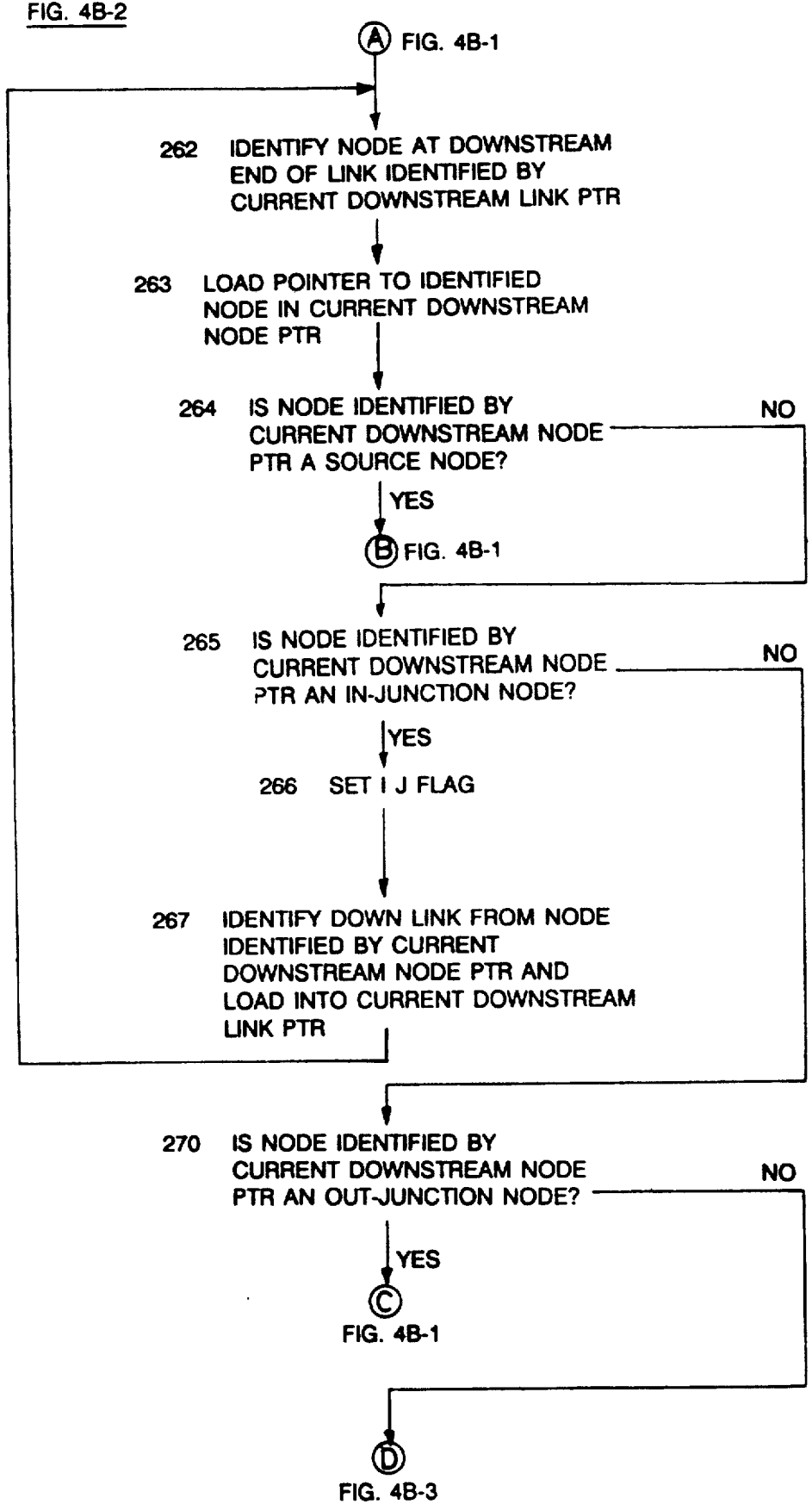

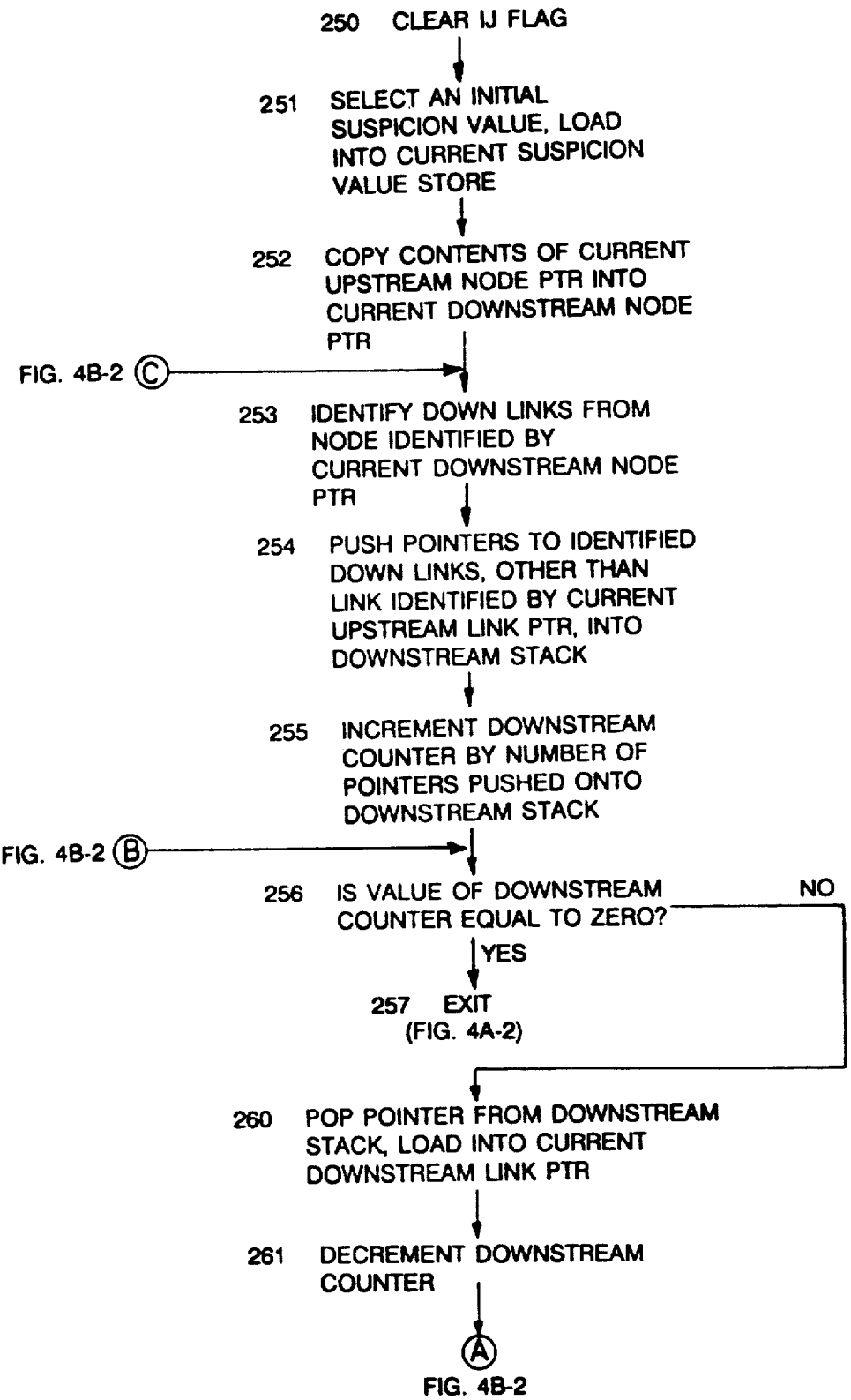
FIG. 4B-1 DOWNSTREAM SEARCH OPERATIONS

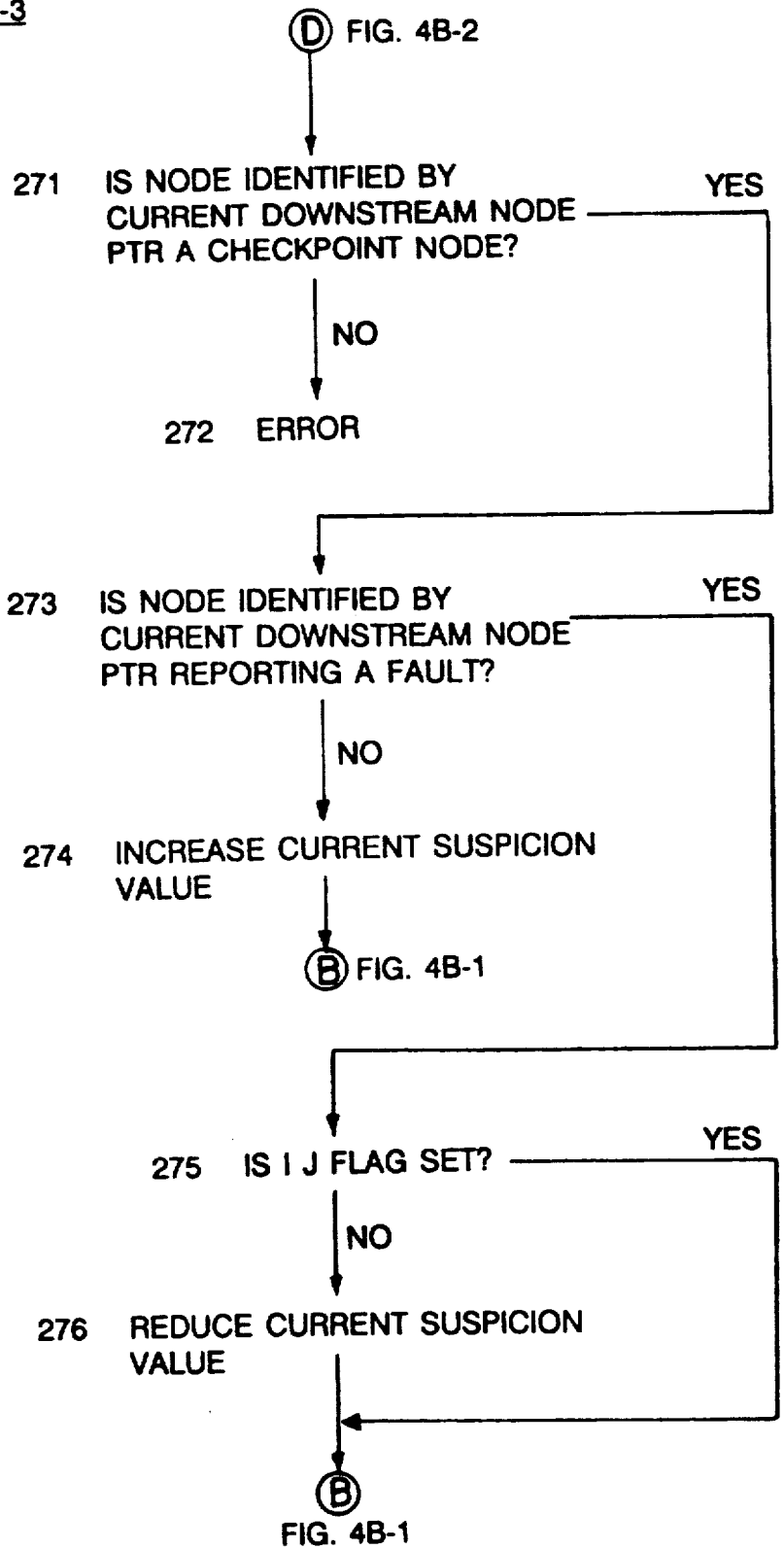

FAULT DIAGNOSTIC SYSTEM

CROSS-REFERENCE TO RELATED PATENT APPLICATION

This application is a continuation of application Ser. No. 07/526,400, filed May 21, 1990, which is a continuation-in-part of application Ser. No. 07/345,587, filed May 1, 1989, both abandoned.

FIELD OF THE INVENTION

The invention relates generally to the field of digital data processing systems and more particularly to such systems for detecting points of failure in complex systems, such as, for example, digital data processing systems.

BACKGROUND OF THE INVENTION

As digital data processing systems become larger and more complex, comprising ever more components, the likelihood of failures increases, as does the difficulty of finding the component which has failed or which is otherwise faulty. Designers are including features in components to facilitate their being tested to determine whether they operate as designed.

However, traditional approaches to troubleshooting have drawbacks that render them less effective as systems become more complex. Given a failure, the traditional approaches enable a set of input values to be determined for which the output of the failed component differs from that expected of a good component. That is, the traditional approaches provide a theory of "test generation," rather than actually diagnosing failed components. They provide little assistance in identifying what failure to consider or, more importantly, what component to suspect to have failed.

Another drawback to current methods of troubleshooting is that they are generally "ad hoc" to a single circuit or system, and it is difficult to modify or adapt them to handle evolving or changing configurations, which is typical of digital data processing systems. This is particularly true of various expert systems employing rules, where the rules usually limited to specific configurations. Typically, the rules result from extensive and time-consuming discussions with experts, and when the configuration changes new rules have to be provided, often requiring repeating the discussions. Further, if the expert system does not have a rule for a particular circumstance, it is unable to provide assistance, and, when that occurs, service personnel often must interact with the design engineers to locate the failed component. Thus, coping with configurational and other system changes often requires extensive commitments of time by the design engineers, as well as service personnel.

SUMMARY OF THE INVENTION

The invention provides a new and improved fault location system, including a new apparatus and method, for locating a fault in a complex system such as a digital data processing system.

In brief summary, the new fault diagnosis system detects possible faulty components in a complex system. The complex system is represented by a representation comprising a plurality of nodes interconnected by links defining a flow among nodes corresponding to flows in the complex system. At least one of the nodes is a checkpoint node, which generates a report if the flow received by it is not correct. A fault diagnosis processor performing an upward search operation to repeatedly step in an upstream path, that is, opposite to the direction of flow in the complex system, from node to node starting with the reporting checkpoint node. At each step, the fault diagnosis processor indicts components represented by both nodes and links in the representation. The fault diagnosis processor steps through the upstream path either recursively or iteratively.

The invention provides a powerful technique for diagnosing faults that exist in even complex systems (such as digital data processing systems) and identifying and locating failures. The fault diagnosis system is particularly adept at handling modifications that are made to the circuit or system under evaluation, such as often occur during the evolution of a design from its early stages to the final form of the design. This is because the fault diagnosis procedure is generic to multiple circuit or system designs, and the circuit or system is represented in a data structure that is separate from the code invoked during fault diagnosis. Thus, changes made to the circuit or system being evaluated are made by updating the data structure, without disturbing the fault diagnosis code.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 3 depict data structures useful in understanding the fault diagnosis system depicted in FIG. 1;

FIGS. 4A-1 through 4B-3 depict flow diagrams useful in understanding the operation of the fault diagnosis system depicted in FIG. 1.

DETAILED DESCRIPTION OF AN ILLUSTRATIVE EMBODIMENT

Figure 1:
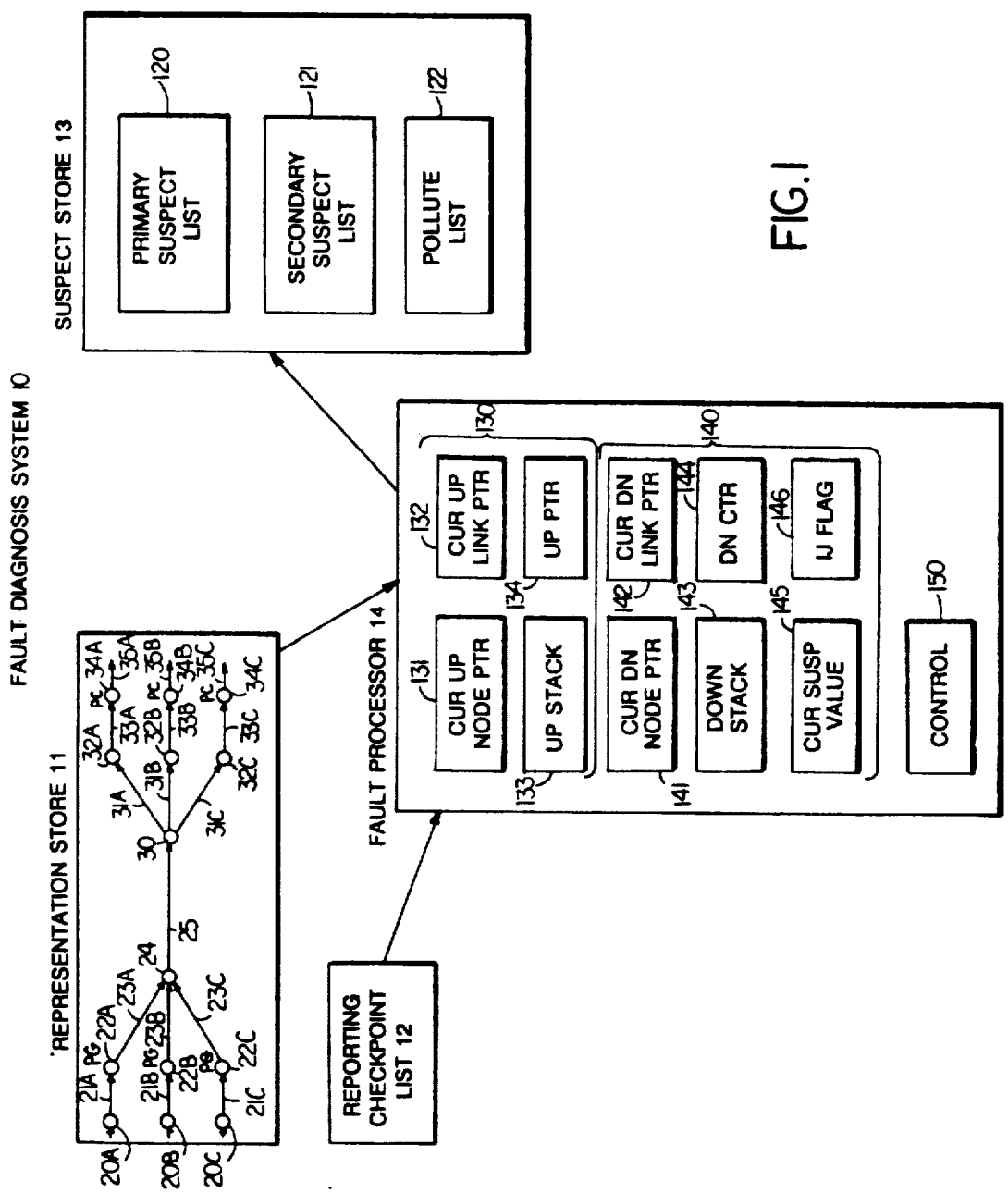
FIG. 1 depicts a functional block diagram of a fault diagnosis system in accordance with the invention.

FIG. 1 depicts a functional block diagram of a fault diagnosis system 10 in accordance with the invention. With reference to FIG. 1, the fault diagnosis system includes a representation store 11, a reporting checkpoint node list 12, and a suspect identification store 13, all controlled by a fault processor 14. The representation store 11 stores a representation of a complex system being diagnosed by the fault diagnosis system 10. The fault diagnostic system 10 will be described in connection with a complex system comprising a digital data processing system, although it will be appreciated that the invention may be used in connection with other types of complex systems. If the complex system is a digital data processing system, the representation stored in the representation store 11 essentially comprises an abstraction, as described below, of the complex system, comprising a plurality of nodes interconnected by links.

In the representation stored in representation store 11, at least some of the nodes are identified as checkpoint nodes. In a digital data processing system, a checkpoint node corresponds to components which check parity of a signal. Each checkpoint node monitors the condition of a signal at a particular location in the digital data processing system, and generates a report if it, using a parity signal, detects an error. Typical digital data processing systems maintain error logs which contain reports of errors from the checkpoint nodes, which effectively provide the reporting checkpoint node list 12. A report by a checkpoint node indicates that a fault occurred in a component in the digital data processing system upstream of the checkpoint node, assuming the checkpoint node is itself not faulty. That is, a report by a checkpoint node indicates that a fault has occurred in some component in the digital data processing system which contributed to the generation of the signal received by the checkpopint node. The error logs may, along with reports from the checkpoint nodes, contain the values of signals and other conditions at other points in the complex system at the times at which the error reports were generated.

Before proceeding further, it will be helpful to further describe the representation stored in representation store 11. The representation represents a complex system that receives input signals from various source nodes (not shown) connected at the left (as shown in FIG. 1), and transmits output signals to various receivers (also not shown) connected to the right (as shown in FIG 1). The representation represents the complex system as a plurality of nodes interconnected by links, both of which represent components in the complex system, which pass signals from the source nodes to the receivers. In the specific example depicted in the representation store in FIG. 1, nodes 20A through 20C (generally identified by reference numeral 20) represent nodes at which the complex system receives the input signals and which generate, in response thereto, data signals for transmission over lines represented by links 21A through 21C to nodes 22A through 22C. Nodes 22A through 22C represent components which receive the input signals and generate, in response thereto, parity signals; the nodes are labeled "PG", which stands for "parity generator". The components represented by nodes 22A through 22C couple the data signals and parity signals over lines and other components represented by links 23A through 23C to a common node 24, which represents a multiplexer.

The multiplexer, represented by the common node 24 in the representation, generates a multiplexed signal, based on the signals, including the data signals and the parity signals, that it receives from the links 23A through 23C, and transmits it through components represented by link 25. The multiplexed signal is passed through components represented by link 25 to a demultiplexer represented by node 30. The demultiplexer demultiplexes the signal received from the components represented by link 25 and transmits demultiplexed signals through components represented by links 31A through 31C to components represented by nodes 32A through 32C.

The components represented by nodes 32A through 32C, in turn, couple signals, which comprise both data signals and parity signals, through components represented by links 33A through 33C to checkpoint nodes 34A through 34C. The components, which comprise parity check circuits, represented by each of the checkpoint nodes 34A through 34C test the data and parity signals to verify whether the signal they receive is correct. In addition, the components represented by each of the checkpoint nodes 34A through 34C couple the signals to components represented by links 35A through 35C for transmission to other circuitry (not shown) downstream of the links.

The fault processor 14 isolates likely locations of faults in the complex system by identifying locations in the complex system at which the signal is known to be bad, and repeatedly steps from node to node upstream, towards source nodes, and indicting components represented by all nodes and links traversed along each possible path upstream until it identifies a node at which the signal is known not to be bad. During the upstream search (which may be performed by stepping from node to node either recursively or iteratively), the fault processor 14 may exonerate components in response to selected exoneration criteria.

A representation stored in representation store 11 comprises a plurality of types of nodes, data structures of which are described below in connection with FIGS. 2A through 2F, including a source node 50, a destination node 60, a checkpoint node 70, an in-junction node 80, an out-junction node 90 and a mixed junction 100. A source node 50 represents one or more components in the complex system which originates a correct signal and passes it to a downstream link. In particular, the source node 50 represents components which transmit signals that are presumed correct to other components represented by links and other types of nodes. Essentially, a source node 50 represents components that receive a signal, which may represent, for example, data and which generate check information, such as a parity signal, which verify the correctness of the signal. The source node transmits the data signal and parity signal to a downstream link. A destination node 60 may be provided to represent one or more components in the complex system which receive a signal from an upstream link and do not pass it to another component, effectively terminating transmission of the signal. A checkpoint node 70 represents a component, such as a parity checker in a digital data processing system, which receives a signal from an upstream link, performs a check operation to verify the correctness of the received signal, and passes the signal, whether correct or not, to a downstream link.

In addition, a representation may comprise three types of junctions, including an in-junction node 80, an out-junction node 90 and a mixed junction 100. An in-junction node 80 represents, for example, a multiplexer or other components that receive a plurality of signals from components represented by a plurality of links and couples as an output one signal to components representing a single link. Contrariwise, an out-junction node 90 represents, for example, a demultiplexer or other components that receive a signal from components representing one link and selectively couples it as an output to components represented by plurality of links. A mixed junction 100 effectively comprises a combination of an in-junction node 80 and an out-junction node 90, representing a component that receives signals from components representing a plurality of links and couples as outputs signals to components representing a plurality of links. If an in-junction node 80 is a multiplexer, an out-junction node 90 is a de-multiplexer or mixed junction 100 is a multiplexer/de-multiplexer combination, the component may also have a control signal input which controls the selection of the link from which an input signal is coupled or to which the output signal is coupled. Since the control signal is not part of the signal flow in the directed acyclic graph, it is not shown in the representation; it may, however, be used by the fault processor in selecting upstream paths to traverse during the indictment process.

The details of the operations performed by the fault processor 14 will be described below in connection with FIGS. 1 through 4B-3. In general, the fault processor 14 begins operations at a checkpoint node, in the representation stored in representation store 11, that is reporting an error. That is, the fault processor begins operations at a checkpoint node identified in the reporting checkpoint node list 12. It will be appreciated from the following description that is desirable for the fault processor to begin operations at a reporting checkpoint node that is furthest downstream in the representation store 11 to avoid duplication, but if that is not done the results will not differ.

After the fault processor 14 selects a reporting checkpoint node from the reporting checkpoint node list 12, it identifies the checkpoint node in the representation store 11 and the upstream link connected thereto and steps upstream, along the upstream link to the next node upstream. The fault processor 14 also loads the identification of the components represented by the upstream link into the suspect store, since the components represented by the link may cause the error identified by the checkpoint node. Search in the upstream direction proceeds from node to node until the fault processor 14 encounters a node in the representation store 11 that is either:

(i) a checkpoint node that is not reporting an error, since the checkpoint node is thereby indicating that no component upstream thereof is faulty;

(ii) a source node, since the representation contains no nodes upstream thereof;

(iii) an out-junction node, if a downstream search operation (described below) starting therefrom uncovers evidence that justifies discontinuing the search.

Until the fault processor 14 encounters one of these three types of nodes, it iteratively (or recursively) sequences up the links from node to node, indicting the components represented by both the nodes and the links by storing the identifications of the components in the suspect store 13.

If, during an upstream search, the fault processor 14 encounters an in-junction node, then it may perform the upstream search along all of the upstream links connected thereto. However, if the in-junction node represents a multiplexer, and it the checkpoint node downstream thereof reports an error only for signals from one upstream path, the fault processor 14 steps upstream only along that path.

The fault processor 14 performs an upstream search operation beginning from each reporting checkpoint node, that is, each checkpoint node in the reporting checkpoint node list 12. It will be appreciated that the fault processor 14 may encounter some reporting checkpoint nodes multiple times in this operation. In addition, since the criteria identified above used by the fault processor 14 for terminating an upstream search operation does not specify terminating the upstream search on locating a reporting checkpoint node, an upstream search may cover some nodes and links multiple times. To reduce the duplication, the reporting checkpoint node list 12 may include a flag associated with each reporting checkpoint node that the fault processor sets when it encounters the reporting checkpoint node. If such flags are included, the fault processor 14 may set the flag associated with a reporting checkpoint node when it encounters it, either at the beginning or during an upstream search operation, and when beginning an upstream search operation beginning with another checkpoint node it may ignore checkpoint nodes whose associated flags are set.

During the upstream search, the fault processor 14 also performs various operations to tend to exonerate components, that is, to indicate that some components are less likely than others to be at fault. In one operation, if the fault processor determines during an upstream search operation that a node is a checkpoint node, it determines whether the checkpoint node is identified in the reporting checkpoint list 12 as also reporting a fault. If so, it is less likely that components downstream of the reporting checkpoint node will be at fault, since the new checkpopint node identified as reporting an error is thereby indicating that the fault is upstream of that checkpoint node. As a result, the fault processor 14 exonerates those components in the suspect store 13. In one embodiment, the fault processor 14, when it initially indicts a component as possibly being at fault by storing its identification in the suspect store 13, also stores therewith a suspicion value. In the exoneration operation, the fault processor 14 reduces the suspicion values of the components it is exonerating.

A second exoneration operation is based on the likelihood that, over time, signals transmitted through an out-junction 90 node or downstream through a mixed junction node 100 will likely be transmitted over many, and perhaps all, of the downstream paths emanating from the node. Accordingly, the fault processor 14, if it encounters an out-junction node 90 or mixed junction node 100 during an upstream search, temporarily suspends the upstream search and performs a downstream search operation. In this operation, the fault processor 14 sequentially steps down each of the paths starting with each of the downstream links from the out-junction node or mixed junction node, other than the downstream link over which the fault processor 14 encountered the out-junction node, to determine information which may tend to exonerate the components which have already indicted downstream of the out-junction node or components, which will be indicted upstream of the out-junction node when the upstream search is continued. The details of the downstream search operation will be described below; however, briefly, the fault processor determines, during a downstream search, whether:

(i) checkpoint nodes along multiple downstream paths are also reporting faults, in which case it is likely that the fault is upstream of the out-junction node, and so the fault processor 14 exonerates the components listed in the suspect store 13 downstream of the out-junction node; or (ii) checkpoint nodes along multiple downstream paths are not also reporting faults, in which case it is likely that the fault is downstream of the out-junction node, and so the fault processor 14 may discontinue the upstream search (as noted above), or continue the upstream search and exonerate the otherwise indicted components.

If the fault processor 14 encounters a mixed junction 100, it performs operations described above for both an out-junction node 90 and an in-junction node 80, first performing the downstream search operations for an out-junction node 90.

As noted above, if the processor 14 encounters an out-junction node 90 or a mixed junction node 100, it performs a downstream search operation to attempt to exonerate components either upstream or downstream thereof. Initially, during a downstream search operation, the fault processor 14 selects an initial downstream link for an initial downstream search path, and iteratively steps in the downstream direction, from node to node, beginning with the selected downstream link. At each node, the fault processor 14 determines the type of node. If the fault processor 14 determines that the node is an in-junction node, it notes that fact, and if it determines that the node is an out-junction node or a mixed junction note it recursively performs a downstream search operation in connection with that out-junction node.

The fault processor 14 stops the downstream search operation along a path when it encounters either a source node or a checkpoint node, whether or not the checkpoint node is reporting a fault. Thereafter, the fault processor 14 returns to the last out-junction node encountered to begin a downstream search operation along another downstream path therefrom, or, if downstream search operations have been performed in connection with all downstream paths, it returns to the next out-junction node upstream to begin a downstream search operation in connection with the next downstream path therefrom. If the fault processor 14 has performed downstream search operations in connection with all downstream paths of the out-junction node for which it originally began a downstream search operation, it may resume an upstream search operation therefrom.

The fault processor 14 may, upon reaching a checkpoint node, also exonerate components downstream of the out-junction node from which the downstream search operation began. If the fault processor 14 determines that the checkpoint node is not reporting a fault, it increases the likelihood that the fault occurred in the components downstream of the out-junction node from which the downstream search began, which are identified in the suspect store 13, and so the fault processor does not exonerate the components in that case. On the other hand, if the fault processor 14 determines that the encountered checkpoint node is reporting, it may exonerate the components downstream of the out-junction node at which the downstream search operation began, unless it encountered an in-junction node along the downstream search path.

During a downstream search operation, the fault processor 14 does not indict components identified by links or nodes along the downstream search paths. It will be appreciated that, if the fault processor 14 encounters a checkpoint node reporting a fault during the downstream search operation, the components represented by the nodes and links upstream of the reporting checkpoint node will be indicted on a later upstream search starting from that reporting checkpoint node.

With this background, a detailed description of the fault diagnosis system 10 will be presented in connection with the Figures. To perform fault diagnosis, the suspect store 13 maintains three lists of potentially faulty components, including a primary suspect list 120, a secondary suspect list 121 and a pollute list 122. The primary suspect list 120 stores the identifications of components of the complex system represented by indicted nodes, and the secondary suspect list 121 stores the identifications of components of the complex system represented by indicted links. The pollute list 122 stores identifications of selected types of components as described below. Along with each component identification, the lists 120 through 122 stores a suspicion value for the component, which may be modified as a result of an exoneration.

The fault processor includes several portions, including an upstream search state portion 130, a downstream search state portion 140, and a control portion 150 which actually implements an upstream or downstream search operation, using state information as maintained by the respective state portions 130 and 140. The upstream search state portion 130 includes a current upstream node pointer 131, which contains a pointer to a node during a upstream search operation and a current upstream link pointer 132 which contains a pointer to a link during an upstream search operation. An upstream stack 133 is loaded with pointers to links when, during an upstream search operation, an in-junction node 80 is encountered. The pointers in the upstream stack are used to identify the various upstream paths, beginning from each in-junction node, to be followed during each upstream search operation. An upstream counter 134 maintains a value identifying the number of pointers in the upstream stack 133, and is decremented as each upstream path is traversed from an in-junction node.

The downstream search state portion 140 includes elements similar to those in the upstream state search portion 130. In particular, the downstream search state portion 140 includes a current downstream node pointer 141, which contains a pointer to a node during a downstream search operation and a current downstream link pointer 142 which contains a pointer to a link during a downstream search operation. A downstream stack 143 is loaded with pointers to links when, during a downstream search operation, an out-junction node 90 is encountered. The pointers in the downstream stack are used to identify the various downstream paths, beginning from each out-junction node, to be followed during each downstream search operation. A downstream counter 144 maintains a value identifying the number of pointers in the downstream stack 143, and is decremented as each downstream path is traversed from an out-junction node. The downstream search state portion also includes a current suspicion value store 145, which stores a current suspicion value which is increased or decreased during the exoneration process performed during the downstream search operation, and an in-junction (IJ) flag 146 which is set if an in-junction node 80 is encountered during a downstream search operation.

The data structures of the various types of nodes, which are actually provided in the representation store 11, are depicted in FIGS. 2A through 2F. With reference to FIG. 2A, the data structure of a source node 50 includes four fields, including a node type field 51, which contains a value that identifies the data structure as representing a source node 50. A down link pointer field 52 contains a pointer to a link downstream of the node 50, specifically to a data structure, described below in connection with FIG. 3, which represents a link. A component identification field 53 contains a value that identifies one or more components represented by the source note 50; the components may be explicitly listed in the component identification field 53 or the field 53 may contain a pointer to a list of the components. The link pointed to by the contents of down link pointer field 52 represents the components to which the components identified in component identification field 53 transmit a signal. Finally, a value field 54 contains a value representing the value of the input signal provided by the corresponding source node. The value may be provided by the error log maintained by the complex system.

The data structure of a destination node 60 also includes four fields. A node type field 61 contains a value that identifies the data structure as representing a destination node. An up-link pointer 62 contains a pointer to a link upstream of the destination node 60, specifically to a data structure, described below in connection with FIG. 3, which represents a link. A component identification field 53 contains a value that identifies one or more components represented by the destination node 60. The link pointed to by the contents of up-link pointer field 62 represents the components from which the components identified in component identification field 63 receive a signal. Finally, a value field 64 may contain a value relating the value of the signal received by the corresponding destination node, as indicated by the error log of the complex system; alternatively, the value field 64 may be empty.

The data structure of a checkpoint node 70 (FIG. 2) includes five fields. A node type field 71 contains a value that identifies the data structure as representing a checkpoint node. An up link pointer field 72 and a down link pointer field 73 contain pointers to links upstream and downstream, respectively, of the checkpoint node 70, and a component identification field 74 contains a value that identifies one or more components represented by the checkpoint node 70. The link pointed to by the contents of up-link pointer field 72 represents the components from which the components identified in component identification field 74 receive a signal, and the link pointed to by the contents of down link pointer field 73 represents the components to which the components identified in component identification field 74 transmit a signal. Finally, an on/off field 75 contains a value that identifies whether the checkpoint node 70 is on or off, that is, whether or not the components represented by the checkpoint node 70 are operating.

The data structure of an in-junction node 80 (FIG. 2D) includes a number of fields, the number depending on the number of up-links connected thereto. A node type field 81 identifies the data structure 80 as representing an in-junction node. The next field, an up-link number field 82 identifies the number of upstream links connected to the in-junction node 80. Following the up-link number field 82 is a group of up-link pointer fields 83(0) through 83(N) (generally identified by reference numeral 83), each of which points to a link upstream of the in-junction node 80. The number of up-link pointer fields 83 in the data structure representing an in-junction node 80 corresponds to the value in the up-link number field 82. A down-link pointer field 84 contains a pointer to a link downstream of in-junction node 80, and a component identification field 85 identifies one or more components that are represented by the in-junction node 80. Each upstream link pointed to by the contents of an up-link pointer field 83 represents components from which the components identified in component identification field 85 receive a signal, and the downstream link pointed to by the contents of down link pointer field 84 represents the components to which the components identified in component identification field 85 transmit a signal. Finally, as in direction select field 86 identifies the input link to which the corresponding in-junction node 80 was set at the time at which an error was reported, as indicated by the complex system's error log. If the in-junction node 80 represents a multiplexer, for example, the value of the in direction select field 86 identifies which input link's signal was being coupled onto the output link when the error was reported.

The data structure of an out-junction node 90 (FIG. 2E) is similar to that of an in-junction node 80, except that it includes a single up-link pointer field 94 and plurality of down-link pointer fields 93(0) through 93(M) (generally identified by reference numeral 93), the number of down-link pointer fields 93 corresponding to a value in a down-link number field 92. Each of the pointer fields 93 and 94 points to a link, with the downstream link pointed to by the contents of up-link pointer field 94 representing components from which the components identified in a component identification field 95 receive a signal, and the upstream links pointed to by the contents of each down link pointer field 93 representing the components to which the components identified in component identification field 95 transmit a signal. Finally, an out direction select field 96 identifies the output link to which the corresponding out-junction node 90 was set at the time at which an error was reported, as indicated by the complex system's error log. If the out-junction node 90 represents a demultiplexer, for example, the value of the out direction select field 96 identifies which output link signal was receiving a signal when the error was reported.

A final type of node used in a representation is a mixed junction 100 (FIG. 2F), whose data structure is effectively a mixture of a data structure for an in-junction node 80 (FIG. 2D) and an out-junction node 90 (FIG. 2E). In addition to a node type field 101 and a component identification field 106, the data structure includes several fields 102 and 103(0) through 103(K) (generally identified by reference numeral 103), and fields 104 and 105(0) through 105(L) (generally identified by reference numeral 105). Down-link number field 102 contains a value identifying the number of fields 103 in the data structure, with each field 103 receiving a pointer to a link representing components from which the components identified in component identification field 106 receive a signal. Up-link number field 104 contains a value identifying the number of fields 105 in the data structure, with each field 105 receiving a pointer to a link representing components to which the components identified in component identification field 106 transmit a signal. The data structure representing a mixed junction node 100 also has two fields 107 and 108 that are similar to the in direction field 86 and out direction field 96 of the data structures representing an in-junction node 80 and out-junction node 90, respectively.

In a representation stored in representation store 11, the nodes are interconnected by links 110 (FIG. 3), which, in turn, represent components which interconnect the components represented by the various nodes. Each link 110 is represented by a data structure, depicted in FIG. 3, including four fields. The data structure includes a link identification field 111 which stores a value which identifies the data structure as representing a link. A component identification field 114 identifies the components in the complex system represented by the link 110; the components may be explicitly listed in the component identification field 114 or the field 114 may contain a pointer to a list of the components. An up node pointer field contains a pointer that identifies the node upstream of the link 110, that is, the node representing components from which the components identified by component identification field 114 receives a signal. A down node pointer field 113 contains a pointer that identifies the node downstream of the link 110, that is, the node representing components to which the components identified by component identification field transmits a signal.

Figure 3:
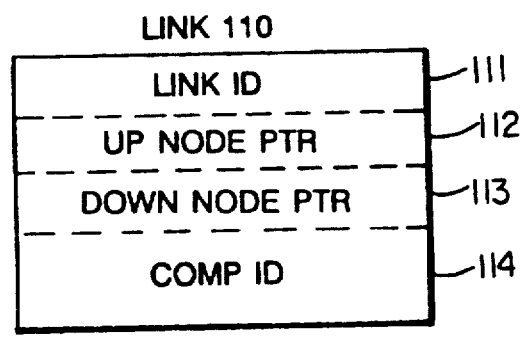
Figures 3, 4A:
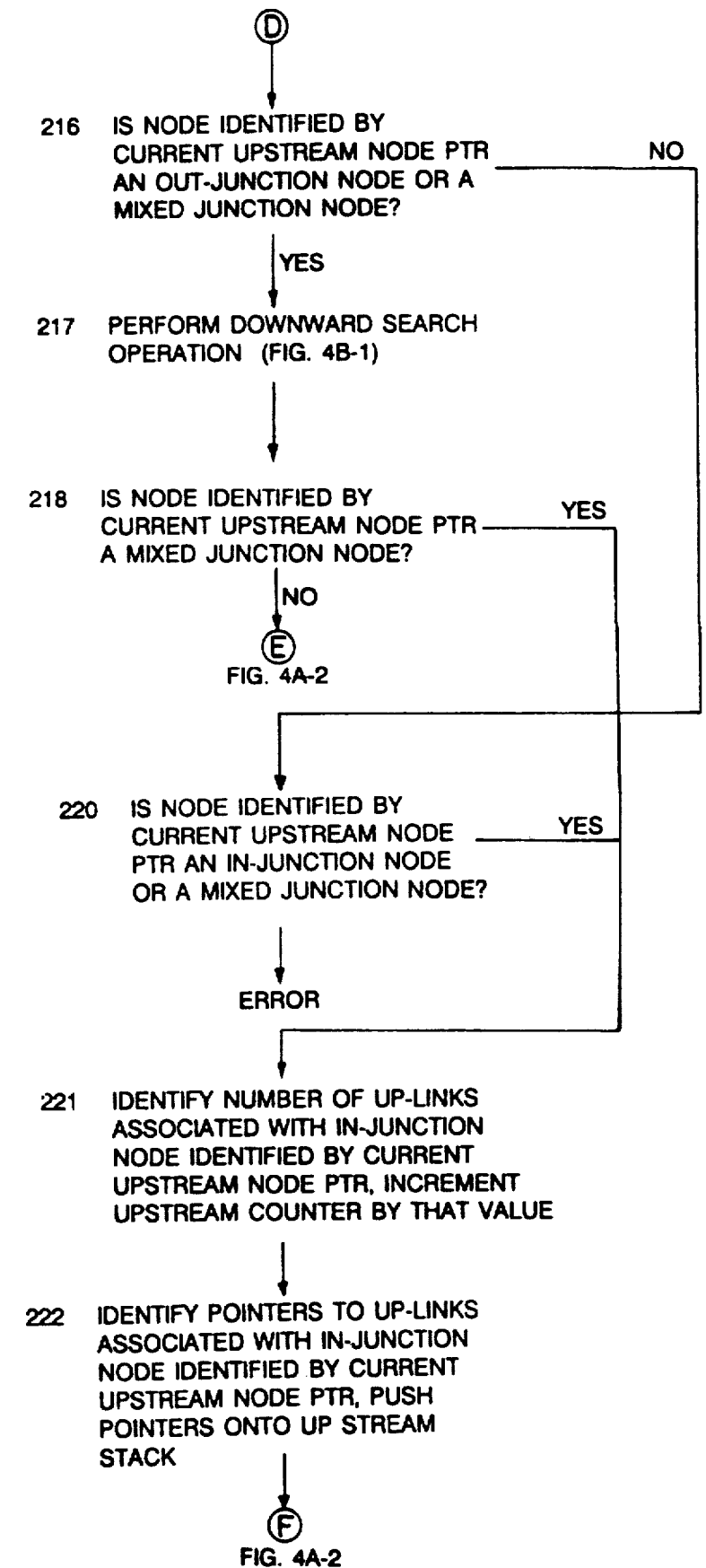

The operations performed by the fault processor 14, and particularly implemented by the control portion 150, are depicted in the flow charts comprising FIGS. 4A-1 through 4B-3 depict. FIGS. 4A-1 through 4A-3 depict operations initiated by the control portion 150 during an upstream search operation, and FIGS. 4B-1 through 4B-3 depict operations during a downstream search operation. With reference to FIG. 4A-1, the control portion 150 first initializes the upstream search state portion 130 and the downstream search state portion 140. In this initialization operation, the control portion 150 loads initial values, such as zeros or null values (step 200). The control portion 150 then determines whether it has performed upstream search operations starting with all reporting checkpoint nodes that are identified in the reporting checkpoint list 12 (step 201). The reporting checkpoint list 12 may maintain a flag associated with each reporting checkpoint node identified in the list 12, which the control portion sets when it begins an upstream search operation with the reporting checkpoint node. In performing step 201, the control portion 150 may search the reporting checkpoint list 12 to determine if it contains a reporting checkpoint node whose associated flag is not set. If the control portion determines that the reporting checkpoint list 12 does not identify any reporting checkpoint node whose flag is not set, it may terminate the upstream search operation (step 202). Alternatively, the control portion 150 may delete each checkpoint node from the reporting checkpoint list 12 as it is used, and terminates the upstream search operation (step 202) when the reporting checkpoint list 12 is empty.

If, on the other hand, the control portion 150 determines in step 201 that upstream search operations have not been performed starting with all reporting checkpoint nodes, it sequences to step 203 in which it selects a reporting checkpoint node which has not been previously used as the starting point for an upstream search. Upon selecting a reporting checkpoint node, the control portion 150 sets the associated flag in the reporting checkpoint list 12 to indicate that it is initiating an upstream search operation starting therefrom. In addition, the control portion 150 loads a pointer to the selected reporting checkpoint node into the current upstream node pointer 131.

Following step 203, the control portion 150 identifies the upstream link connected to the checkpoint node identified in the current upstream node pointer 131 and loads a pointer thereto into the current upstream node pointer 132 (step 204). In this operation, the control portion 150 uses the pointer to the checkpoint node in the current upstream link pointer 131 to identify the node's data structure (FIG. 2C) in the representation 11. The control portion 150 then retrieves the contents of the node's up link pointer field 72, which identifies the upstream link connected to the reporting checkpoint node identified in the current upstream node pointer 131, and copies it into the current upstream link pointer 132.

After obtaining the pointer to the link upstream of the reporting checkpoint node in step 204, the control portion 150 uses the pointer to identify the components of the complex system represented by the link, and load the identifications into the seconday suspect list 121 of the suspect store 13 (step 205). In this operation, the control portion 150 uses the pointer to the link in the current upstream link pointer 132 to identify the data structure of the link in the representation 11. Thereafter, the control portion 150 copies the contents of the link data structure's component identification field 114 (FIG. 3) into the secondary suspect list 121 if the components have not previously been listed therein. The control portion 150 may also load an initial suspicion value along with the identification of each component.

Following step 205, the control portion 150 performs steps 206 and 207 to perform operations similar to those described above in connection with a link, in connection with the node connected upstream of the link. In particular, in step 206 the control portion 150 uses the contents of the current upstream link pointer 132 to identify the link's data structure (FIG. 3) in the representation store 11. The control portion then retrieves the contents of the up node pointer field 112, which comprises a pointer to the node upstream of the link, and stores the pointer in the current upstream node pointer 131 (FIG. 1) to identify the node. The control portion 150 than uses the pointer in the current upstream node pointer 131 to identify the node's data structure in the representation store 11. From the identified node data structure, the control portion 150 retrieves the contents of the structure's component identification field, which it stores in the primary suspect list 120 if the components have not previously been listed therein (step 207). The detailed operations performed during step 207 will vary depending on the type of node, as identified by the contents of the data structure's node type field, since the number of entries from the first entry of the respective data structure to the component identification field in each type of data structure shown in FIGS. 2A through 2C differ. The control portion 150 may also load an initial suspicion value along with the identification of each component.

Following step 207, the operations performed by the control portion depend on the type of node identified in the current upstream node pointer 131. The control portion identifies the node type by retrieving the contents of the node type field, which is the first field in the node's data structure store in representation store 11, of the node identified in the current upstream node pointer 131. If the node is a source node (step 210), there is no node upstream thereof and so the control portion 150 stops the upstream search operation along the path terminating thereat. As described above, and as will be described below in greater detail in connection with steps 221 and 222, if the control portion 150 determines that a node is an in-junction node 80 it performs upstream search operations in connection with each upstream link from the in-junction node. To initiate the upstream search operations along the various upstream paths from each in-junction node, the control portion loads pointers to the various upstream links from the in-junction node into the upstream stack 133 (FIG. 1) and increments the count in the upstream counter 134, which identifies the number of pointers in the upstream stack 133. When beginning an upstream search along each search path, the control portion retrieves the pointer from the top of the upstream stack 133 and decrements the upstream counter 134 (step 212), and, if the upstream counter 134 contains a zero value, upstream searches will have been performed in connection with all upstream search paths. It will be appreciated that, if no node along an upstream search path from a reporting checkpoint node to a source node is an in-junction node, the upstream counter 134 will also contain a zero value.

Thus, if the control portion 150 determines in step 210 that a node identified by the current upstream node pointer 131 is a source node, it determines whether there are any additional upstream search paths from in-junction node by determining whether the value of the upstream counter 134 is zero (step 211). If so, the control portion 150 has enabled all upstream search paths to be traversed from a reporting checkpoint node, and so it returns to step 201 (FIG. 4A-1) to initiate an upstream search operation in connection with another reporting checkpoint node. On the other hand, if the control portion determines that the value of the upstream counter 134 is non-zero, all upstream search paths have not been traversed. To identify the next upstream search path to be traversed, the control portion 150 pops the upstream stack 133 to obtain a pointer to the next link from the nearest in-junction node from the source node at which it can begin traversing the next upstream search path, which it loads into the current upstream link pointer 132 (step 212). The control portion 150 also decrements the upstream counter 134 (step 212). The control portion 150 then sequences to step 205 to begin the upstream search along another upstream search path.

Returning to step 210, if the control portion 150 determines that the node identified by the current upstream node pointer 131 is not a source node, it sequences to step 213 to determine if it is a checkpoint node which is not reporting a fault. If so, the fault is not occurring further upstream of that node, and so the control portion terminates the upstream search operation along that path. In so doing, it performs the series of operations identified by steps 211 and, if appropriate, 212.

If the control portion 150 determines in step 213 that the node identified by the current upstream node pointer 131 is not a checkpoint node which is not reporting a fault, it sequences to step 214 in which it determines whether it is a checkpoint node that is reporting a fault. The node identified by the current upstream node pointer 131 is upstream of the original reporting checkpoint node at which the current upstream search operation began (step 203, FIG. 4A-1). If it is a checkpoint node that is reporting a fault, the fault is upstream of it and so the control portion 150 exonerates the components identified in the primary and secondary suspect lists 120 and 121 (FIG. 1) downstream of the node identified in the current upstream node pointer (step 215). Thereafter, the control portion 150 sequences to step 204 (FIG. 4A-1).

If the control portion determines, in step 214, that the node identified in the current upstream node pointer 131 is not a reporting checkpoint node, the fault may be further upstream in the circuit. Accordingly, the control portion 150 sequences to step 216 in which it determines whether the node is an out-junction node or a mixed junction node. If so, it initiates a downstream search operation which is described below in connection with FIGS. 4B-1 through 4B-3, which may serve to exonerate components downstream of the out-junction along the path just traversed by control portion 150 in reaching the out-junction node.

After performing a downstream search operation, the control portion sequences to step 218 to determine whether the node identified by the current upstream node pointer 131 is a mixed junction node. If not, the node is an out-junction node, and so the control portion 150 returns to step 204 (FIG. 4A-2) to continue the upstream search operation.

If the control portion 150 determines, in step 216, that the node identified by the current upstream node pointer 131 is not an out-junction node 90 or a mixed junction node 100, it sequences to step 220 to determine if the node is an in-junction node 80. If not, since the control portion 150 has, in prior steps in the upstream search operation (FIGS. 4A-1 through 4A-3) tested for all types of nodes, an error has occurred in the operation of the control portion 150. However, if the control portion 150 determines, in step 220, that the node is an in-junction node, or if it determines, in step 218, that the node is a mixed junction node, it sequences to steps 221 and 222 to push, into the upstream stack 133, pointers to the upstream links from the node (step 222), and to increment the upstream counter 134 by the number of upstream links pushed onto the upstream stack 133 (step 221), thereby facilitating the start of the upstream search along the multiple up links associated with the in-junction node or mixed junction node identified by the current upstream node pointer 131. Thus, the pointers to the links are available, in the upstream stack 133, to the control portion 150 when it determines, in steps 210 or 213, that a node is a source node or a non-reporting checkpoint node, at which point it stops further upstream sequencing.

It will be appreciated that, by storing, in step 221, the pointers to the upstream links associated with an in-junction node in a stack such as upstream stack 133, popping the stack when a source node or non-reporting checkpoint node is encountered ensures that all of the all upstream paths are traversed from each in-junction node encountered during an upstream search operation from a reporting checkpoint node, without repetition. The upstream stack 133 effectively provides nesting of traversal of upstream paths, so that, if a second in-junction node is encountered along an upstream path from a first in-junction node, the upstream paths beginning with upstresam links from the second in-junction node will be traversed before beginning an upstream path for another upstream link defined by the first in-junction node.

As set forth above, the control portion 150 may determine, particularly in connection with steps 218 or 220, that the node identified by the current upstream node pointer 131 is a multiplexer. The complex system that is being diagnosed by the fault diagnosis system 10 may maintain, in addition to the identifications of the reporting checkpoint nodes, the identifications of the miultiplexer setting which gave rise to the fault report by the checkpoint nodes; otherwise stated, the complex system may identify, when a checkpoint node reports a fault, the particular line, represented by an up link, connected to the multiplexer, represented by an in-junction node, whose signal was coupled to the multiplexer output terminal, represented by the down link therefrom. In that case, the control portion 150 may push the pointer to only that link onto the upstream stack 133 and increment the upstream counter only by one in steps 221 and 221, before sequencing to step 211, thereby ensuring that the upstream path beginning only with that link is subsequently traversed. Alternatively, the control portion 150 may load the pointer to the link in the current upstream link pointer 132 and return to step 205 (FIG. 4A-1).

As described above in connection with step 216 (FIG. 4A-3), if the control portion 150 determines that a node identified by the current upstream note pointer 131 is an out-junction node or a mixed junction node, it sequences to step 217 to perform a downstream search operation in connection with the downstream links associated therewith. The downstream search operation identifies information which may exonerate the indicted components, that is, at least some of the components identified in the lists 120 and 121, in the suspect store 13. The downstream search operation will be described in connection with FIGS. 4B-1 through 4B-3.

With reference to FIG. 4B-1, the control portion 150, on beginning the downstream search operation, performs several initialization operations in connection with the elements of the downstream search state portion 140 of fault processor 14. The control portion clears the in-junction flag 146 (step 250), selects an initial suspicion value and loads it into the current suspicion value store (step 251) and copies the contents of the current upstream node pointer 131 and current upstream link pointer 132 into the current downstream node pointer 141 and current downstream link pointer 142, respectively (step 252). If the downstream search operation is the first such operation during a current upstream search operation, the initial suspicion value may be any selected constant value; alternatively, if a previous downstream search operation has been performed in connection with the current upstream search operations, the initial suspicion value may be a function of a final suspicion value during the previous downstream search operation.

Thereafter, the control portion 150 identifies the downstream links associated with the node identified in the current downstream node pointer 141 (step 253), that is, the out-junction node or mixed junction node which caused the control portion 150 to initiate the downstream search operation. The downstream links are identified in the fields 93, if the node is an out-junction node, or fields 103, if the node is a mixed junction node, of the data structure representing the complex system in representation store 11 pointed to by the contents of the current downstream node pointer 141.

Following step 253, the control portion 150 pushes onto the downstream stack 143 the pointers to the downstream links, other than the link identified by the current downstream link pointer 142, which were identified in step 253 (step 254) and increments the downstream counter 144 by the number of pointers pushed onto the downstream stack 143. The control portion 150 uses the downstream stack 143 to identify the downstream paths, defined by the downstream links from the out-junction node or mixed junction node, along which to perform the downstream search operation, and since the downstream links identified by the current downstream link pointer 142 is the link along which the node was reached during the upstream search operation (in step 216), and a downstream search operation along the path starting with that link would not provide any exoneration information, the control portion 150 does not push a pointer to that link onto the downstream stack 143.

After pushing pointers to downstream links onto the downstream stack 143 and incrementing the downstream counter (steps 254 and 255), the control portion 150 determines whether the value of the downstream counter is zero (step 256). If so, a downstream search has been performed in connection with all of the required downstream paths from the out-junction node or mixed junction node at which the downstream search operation began, and so the control portion 150 exits (step 257) returning to the upstream search operation (step 218, FIG. 4A-3).

If, however, the control portion 150 determines, in step 256, that the value of the downstream counter is not equal to zero, it sequences to step 260, in which it pops the downstream stack 143 to obtain a pointer to a link, which it loads into the current downstream link pointer 142, after which it decrements the downstream counter 144 (step 261). The control portion 150 then identifies the node at the downstream end of the link identified by the current downstream link pointer 142 (step 262) and loads it into the current downstream node pointer 141 (step 263). The control portion 150 identifies the node by retrieving, from the representation stored in representation store 11, the contents of the downstream node pointer field 113 of the data structure of the link identified by the current downstream link pointer 142.

Subsequent operations of the control portion 150 depend upon the type of node identified by the current downstream node pointer 141, which the control portion 150 determines by retrieving the contents of the first field (which contains the identification of the node type) of the data structure of that node in the representation store 11. If the control portion 150 determines that the node identified by the current downstream node pointer 141 is a source node (or perhaps a destination node), it terminates the downstream search along the path which let thereto, and returns to step 256 to begin a downstream search along another path, if one exists (step 264).

If the control portion determines in step 264 that the node identified by the current downstream node pointer 141 is not a source node (or destination node), it sequences to step 265 to determine if it is an in-junction node. If so, it sets the in-junction flag (step 266), and retrieves the downstream link pointer associated with the in-junction node, which it loads into the current downstream link pointer 142 (step 267). In this operation, the control portion uses the contents of the current downstream node pointer 141 to identify the data structure for the in-junction node in the representation store 11, and retrieves the contents of the structure's downstream link pointer field 84, which constitutes the required downstream link pointer. Thereafter, the control portion returns to step 262 to continue the downstream search along the path defined by the downstream link pointer in current downstream link pointer 142.

If the control portion determines, in step 265, that the node identified by the current downstream node pointer 141 is not an in-junction node, it sequences to step 270 to determine if the node is an out-junction note. If so, it returns to step 253 (FIG. 4B-1) to perform operations similar to those it performed at the beginning of the downstream search operation. In particular, the control portion 150 pushes pointers to all of the node's downstream links onto the downstream stack 143 and increments the downstream counter 144 by the number of pointers pushed. The control portion uses the downstream stack 143 and downstream counter 144 for similar purposes as the upstream stack 133 and upstream counter 134. That is, during the downstream search operation it iteratively steps down the downstream paths defined by all of the pointers identified in the downstream stack 143, avoiding repetition if an out-junction node is encountered along a downstream path is an out-junction node.

If the control portion 150 determines, in step 270 that the node identified by the current downstream node pointer 141 is not an out-junction node, it sequences to step 271 to determine whether the node is a checkpoint node. If the node is not a checkpoint node, an error has occurred and so the control portion sequences to step 272 to take corrective measures (not shown). On the other hand, if the node is a checkpoint node, the control portion 150 does not continue the downstream search beyond the reporting checkpoint node. The control portion 150 determines whether the node is reporting a fault (step 273). If not, the control portion 150 increases the suspicion value in the current suspicion value store 145 (step 274), and returns to step 256 to perform a downstream search in connection with another downstream search path, if all downstream search paths have not been traversed.

However, if the control portion 150 determines that the checkpoint node is reporting a fault (step 273), it determines whether the in-junction flag 146 is set (step 275), which indicates whether one of the nodes along the downstream search path to the checkpoint node is an in-junction node. If the control portion 150 determines that the in-junction flag is not set, it reduces the suspicion value in the current suspicion value store 145 (step 276), and sequences to step 256 to perform a downstream search in connection with another downstream search path, if all downstream search paths have not been traversed. On the other hand, if the control portion 150 determines, in step 275, that the in-junction flag 146 is set, it sequences directly to step 256 without modifying the suspicion value in the current suspicion value store 145.

After the control portion 150 has completed the downstream search operation depicted on FIGS. 4B-1 through 4B-3 and returns to step 218 (FIG. 4A-3) it may use the suspicion value in the current suspicion value store 146 in determining the suspicion values for components, identified in the suspect store 13. If the suspicion value in store 146 is below the initial suspicion value, the control portion 150 reduces the suspicion values of the components downstream of the out-junction node or mixed junction node at which the downstream search operation began. It will be appreciated that, even if the control portion determines that a checkpoint node is reporting a fault during a downstream search operation, if a node upstream of the checkpoint node is an in-junction node, the checkpoint node may be reporting a fault detected in connection with an upstream link for the in-junction node other than the one used in the downstream search operation. Thus, prior to modifying the suspicion value in current suspicion value store 145, the control portion 150 tests the condition of the in-junction flag 146.

While the control portion 150 has been described as operating in connection with a representation in representation store 11 which is in the nature of a directed acyclic graph of nodes interconnected by links, the control portion 150 may also perform other operations, if required by some types of components comprising the complex system. For example, if the complex system is a digital data processing system, one component of the system may comprise a bus, which may be represented by a mixed junction node. In a digital data processing system, a bus may be subject to bus pollution, which occurs if a faulty component is transmitting a signal over the bus when it should not be. If the control portion 150 encounters a node which represents a bus, it generates a pollute list, which it stores in pollute list store 122 in suspect store 13, comprising the set of links, representing components connected to the bus, other than the set of links representing components connected to the bus that are properly transmitting signals over the bus when a fault is detected.

It will be appreciated that the various elements comprising the fault diagnosis system described above and depicted in the FIGS. may be provided in special-purpose hardware or in a digital data processing system programmed to perform the operations described in FIGS. 4A-1 through 4B-3.

The foregoing description has been limited to a specific embodiment of this invention. It will be apparent, however, that variations and modifications may be made to the invention, with the attainment of some or all of the advantages of the invention.

For example, fault processor 14 may step from node to node recursively, rather than iteratively. Also, the various data structures need not be resident at all times. Rather, the data structures may be created as needed during the fault diagnosis procedure, and discarded upon completion of the diagnosis.

Therefore, it is the object of the appended claims to cover all such variations and modifications as come within the true spirit and scope of the invention.

What is claimed as new and desired to be secured by letters patent of the United States is:

1. A method for using a fault diagnosis system to locate a fault in a complex system including a plurality of components that receive input signals and transmit output signals, wherein the fault diagnosis system includes a representation store for storing a representation of the complex system as a plurality of interconnected nodes, including checkpoint and outjunction nodes, wherein the representation store includes a plurality of data structures corresponding to the nodes, wherein a data structure corresponding to a node identifies as upstream nodes any nodes from which the node receives input signals and identifies as downstream nodes any nodes to which the node transmits output signals, wherein a checkpoint node detects errors in input signals and reports whether an error has occurred, wherein an outjunction node transmits output signals to a plurality of downstream nodes, and wherein the fault diagnosis system includes a suspect store for identifying nodes that are likely to be causing errors, and wherein the method performed by the fault diagnosis system comprises the following steps:

selecting a checkpoint node that is reporting an error as a current upstream node, to begin an upstream search;

selecting as a current upstream node, after the upstream search begins, a node that is identified as an upstream node in the data structure corresponding to a prior upstream node, wherein the prior upstream node is a node that was most recently selected as the current upstream node, and wherein the step of selecting the current upstream node is repeated to continue the upstream search;

indicting the current upstream node, after its selection, by identifying the current upstream node in the suspect store as a node that is likely to be causing errors;

exonerating the nodes that are downstream from the current upstream node, at times when the current upstream node is a checkpoint node that is reporting an error, by not identifying the nodes that are downstream from the current upstream node in the suspect store as nodes that are likely to be causing errors, after the current upstream node is selected;

selecting as a current downstream node, at times when the current upstream node is an outjunction node, a node that is identified as a downstream node in the data structure corresponding to the current upstream node, to begin a downstream search;

selecting as a current downstream node, after the downstream search begins, a node that is identified as a downstream node in the data structure corresponding to a prior downstream node, wherein the prior downstream node is a node that was most recently selected as the current downstream node, and wherein the step of selecting the current downstream node is repeated to continue the downstream search;

indicting the nodes that are downstream from the current upstream node and are not downstream from a checkpoint node that is reporting an error, at times when the current downstream node is a checkpoint node that is not reporting an error, by identifying the nodes that are downstream from the current upstream node and are not downstream from a checkpoint node that is reporting an error in the suspect store as nodes that are likely to be causing errors; and exonerating the nodes that are downstream from the current upstream node, at times when the current downstream node is a checkpoint node that is reporting an error, by not identifying the nodes that are downstream from the current upstream node in the suspect store as nodes that are likely to be causing errors, after the current downstream node is selected.

2. A method in accordance with claim 1, in which the step of selecting the current downstream node is not performed at times when the prior downstream node is a checkpoint node.

3. A method in accordance with claim 2, in which the step of selecting the current downstream node is not performed at times when the data structure corresponding to the prior downstream node does not identify any nodes to which the prior downstream node transmits output signals.

4. A method in accordance with claim 3, in which the step of selecting the current upstream node is not performed at times when the prior upstream node is a checkpoint node that is not reporting an error.

5. A method in accordance with claim 4, in which the step of selecting the current upstream node is not performed at times when the data structure corresponding to the prior upstream node does not identify any nodes from which the prior upstream node receives input signals.

6. A method in accordance with claim 5, in which the suspect store in the fault diagnosis system includes a suspicion value corresponding to each node that may be causing errors, and in which:

the step of indicting a node includes increasing the suspicion value corresponding to the node in the suspect store; and the step of exonerating a node includes reducing the suspicion value corresponding to the node in the suspect store.

7. A method in accordance with claim 4, in which the suspect store in the fault diagnosis system includes a suspicion value corresponding to each node that may be causing errors, and in which:

the step of indicting a node includes increasing the suspicion value corresponding to the node in the suspect store; and the step of exonerating a node includes reducing the suspicion value corresponding to the node in the suspect store.

8. A method in accordance with claim 3, in which the step of selecting the current upstream node is not performed at times when the data structure corresponding to the prior upstream node does not identify any nodes from which the prior upstream node receives input signals.

9. A method in accordance with claim 8, in which the suspect store in the fault diagnosis system includes a suspicion value corresponding to each node that may be causing errors, and in which:

the step of indicting a node includes increasing the suspicion value corresponding to the node in the suspect store; and the step of exonerating a node includes reducing the suspicion value corresponding to the node in the suspect store.

10. A method in accordance with claim 3, in which the suspect store in the fault diagnosis system includes a suspicion value corresponding to each node that may be causing errors, and in which:

the step of indicting a node includes increasing the suspicion value corresponding to the node in the suspect store; and the step of exonerating a node includes reducing the suspicion value corresponding to the node in the suspect store.

11. A method in accordance with claim 2, in which the step of selecting the current upstream node is not performed at times when the prior upstream node is a checkpoint node that is not reporting an error.

12. A method in accordance with claim 11, in which the step of selecting the current upstream node is not performed at times when the data structure corresponding to the prior upstream node does not identify any nodes from which the prior upstream node receives input signals.

13. A method in accordance with claim 12, in which the suspect store in the fault diagnosis system includes a suspicion value corresponding to each node that may be causing errors, and in which:

the step of indicting a node includes increasing the suspicion value corresponding to the node in the suspect store; and the step of exonerating a node includes reducing the suspicion value corresponding to the node in the suspect store.

14. A method in accordance with claim 11, in which the suspect store in the fault diagnosis system includes a suspicion value corresponding to each node that may be causing errors, and in which:

the step of indicting a node includes increasing the suspicion value corresponding to the node in the suspect store; and the step of exonerating a node includes reducing the suspicion value corresponding to the node in the suspect store.

15. A method in accordance with claim 14, in which the complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

16. A method in accordance with claim 11, in which the complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

17. A method in accordance with claim 2, in which the step of selecting the current upstream node is not performed at times when the data structure corresponding to the prior upstream node does not identify any nodes from which the prior upstream node receives input signals.

18. A method in accordance with claim 17, in which the suspect store in the fault diagnosis system includes a suspicion value corresponding to each node that may be causing errors, and in which:
    the step of indicating a node includes increasing the suspicion value corresponding to the node in the suspect store; and
    the step of exonerating a node includes reducing the suspicion value corresponding to the node in the suspect store.

19. A method in accordance with claim 2, in which the suspect store in the fault diagnosis system includes a suspicion value corresponding to each node that may be causing errors, and in which:
    the step of indicating a node includes increasing the suspicion value corresponding to the node in the suspect store; and
    the step of exonerating a node includes reducing the suspicion value corresponding to the node in the suspect store.

20. A method in accordance with claim 19, in which complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

21. A method in accordance with claim 2, in which the complex system is a digital data processing system, in which the input and output signals include data and parity signals, and in which each of the checkpoints nodes checks the input signals received by the checkpoint node for correct parity, and in which the step of selecting a checkpoint node comprises selecting a checkpoint node that is reporting a parity error.

22. A method in accordance with claim 1, in which the step of selecting the current downstream node is not performed at times when the data structure corresponding to the prior downstream node does not identify any nodes to which the prior downstreams node transmits output signals.

23. A method in accordance with clain 22, in which the step of selecting the current upstream node is not performed at times when the prior upstream node is a checkpoint node that is not reporting an error.

24. A method in accordance with claim 23, in which the step of selecting the current upstream node is not performed at times when the data structure corresponding to the prior upstream nodes does not identify any nodes from which the prior upstream node receives input signals.

25. A method in accordance with claim 24, in which the suspect store in the fault diagnosis system includes a suspicion value corresponding to each node that may be causing errors, and in which:
    the step of indicating a node includes increasing the suspicion value corresponding to the node in the suspect store; and
    the step exonerating a node includes reducing the suspicion value corresponding to the node in the suspect store.

26. A method in accordance with claim 23, in which the suspect store in the fault diagnosis system includes a suspicion value corresponding to each node that may be causing errors, and in which:
    the step of indicating a node includes increasing the suspicion value corresponding to the nodes in the suspect store; and
    the step of exonerating a node includes reducing the suspicion value corresponding to the node in the suspect store.

27. A method in accordance with claim 22, in which the step of selecting the current upstream node is not performed at times when the data structure corresponding to the prior upstream node does not identify any nodes from which the prior upstream node receives input signals.

28. A method accordance with claim 27, in which the suspect store in the fault diagnosis system includes a suspicion value corresponding to each node that may be causing errors, and in which:
    the step of indicting a node includes increasing the suspicion value corresponding to the node in the suspect store; and
    the step of exonerating a node includes reducing the suspicion value corresponding to the node in the suspect store.

29. A method in accordance with claim 22, in which the suspect store in the fault diagnosis system includes a suspicion value corresponding to each node that may be causing errors, and in which:
    the step of indicting a node includes increasing the suspicion value corresponding to the node in the suspect store; and
    the step of exonerating a node includes reducing the suspicion value corresponding to the node in the suspect store.

30. A method in accordance with claim 1, in which the step of selecting the current upstream node is not performed at times when the prior upstream node is a checkpoint node that is not reporting an error.

31. A method in accordance with claim 30, in which the step of selecting the current upstream node is not performed at times when the data structure corresponding to the prior upstream node does not identify any nodes from which the prior upstream node receives input signals.

32. A method in accordance with claim 31, in which the suspect store in the fault diagnosis system includes a suspicion value corresponding to each node that may be causing errors, and in which:
- the step of indicting a node includes increasing the suspicion value corresponding to the node in the suspect store; and
- the step of exonerating a node includes reducing the suspicion value corresponding to the node in the suspect store.

33. A method in accordance with claim 30, in which the suspect store in the fault diagnosis system includes a suspicion value corresponding to each node that may be causing errors, and in which:
- the step of indicting a node includes increasing the suspicion value corresponding to the node in the suspect store; and
- the step of exonerating a node includes reducing the suspicion value corresponding to the node in the suspect store.

34. A method in accordance with claim 33, in which the complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

35. A method in accordance with claim 30, in which the complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

36. A method in accordance with claim 1, in which the step of selecting the current upstream node is not performed at times when the data structure corresponding to the prior upstream node does not identify any nodes from which the prior upstream node receives input signals.

37. A method in accordance with claim 36, in which the suspect store in the fault diagnosis system includes a suspicion value corresponding to each node that may be causing errors, and in which:
- the step of indicting a node includes increasing the suspicion value corresponding to the node in the suspect store; and
- the step of exonerating a node includes reducing the suspicion value corresponding to the node in the suspect store.

38. A method in accordance with claim 1, in which the suspect store in the fault diagnosis system includes a suspicion value corresponding to each node that may be causing errors, and in which:
- the step of indicting a node includes increasing the suspicion value corresponding to the node in the suspect store; and
- the step of exonerating a node includes reducing the suspicion value corresponding to the node in the suspect store.

39. A method in accordance with claim 38, in which the fault diagnosis system includes a current upstream node pointer for identifying one of the nodes during an upstream search operation as the current upstream node, and in which the step of selecting the current upstream node includes changing the current upstream node pointer.

40. A method in accordance with claim 39, in which the fault diagnosis system includes a current downstream node pointer for identifying one of the nodes during a downstream search operation as the current downstream node, and in which the step of selecting the current downstream node includes changing the current downstream node pointer.

41. A method in accordance with claim 38, in which the fault diagnosis system includes a current downstream node pointer for identifying one of the nodes during a downstream search operation as the current downstream node, and in which the step of selecting the current downstream node includes changing the current downstream node pointer.

42. A method in accordance with claim 38, in which the complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

43. A method in accordance with claim 1, in which the fault diagnosis system includes a current upstream node pointer for identifying one of the nodes during an upstream search operation as the current upstream node, and in which the step of selecting the current upstream node includes changing the current upstream node pointer.

44. A method in accordance with claim 43, in which the fault diagnosis system includes a current downstream node pointer for identifying one of the nodes during a downstream search operation as the current downstream node, and in which the step of selecting the current downstream node includes changing the current downstream node pointer.

45. A method in accordance with claim 43, in which the complex system is a digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

46. A method in accordance with claim 1, in which the fault diagnosis system includes a current downstream node pointer for identifying one of the nodes during a downstream search operation as the current downstream node, and in which the step of selecting the current downstream node includes changing the current downstream node pointer.

47. A method in accordance with claim 46, in which the complex system is digital data processing system, in which the input and output signals include data and parity signals, and in which each of the checkpoint nodes checks the input signals received by the checkpoint node for correct parity, and in which the step of selecting a checkpoint node comprises selecting a checkpoint node that is reporting a parity error.

48. A method in accordance with claim 1, in which the complex system is a digital data processing system, in which the input and output signals include data and parity signals, and in which each of the checkpoint nodes checks the input signals received by the checkpoint node for correct parity, and in which the step of selecting a checkpoint node coomprises selecting a checkpoint node that is reporting a parity error.

* * * * *